(12) United States Patent
Raybon et al.

(10) Patent No.: US 8,978,872 B2
(45) Date of Patent: Mar. 17, 2015

(54) HIGH SPEED BOARD FEEDER

(75) Inventors: Chris Raybon, Hot Springs, AR (US);
Russell Kennedy, Hot Springs, AR (US); Pat Conry, Hot Springs, AR (US)

(73) Assignee: Baxley Equipment Co., Hot Springs, AK (US)

( * ) Notice: Subject to any disclaimer, the term of this patent is extended or adjusted under 35 U.S.C. 154(b) by 894 days.

(21) Appl. No.: 12/729,311

(22) Filed: Mar. 23, 2010

(65) Prior Publication Data

US 2010/0276250 A1      Nov. 4, 2010

Related U.S. Application Data

(60) Provisional application No. 61/174,716, filed on May 1, 2009.

(51) Int. Cl.
*B65G 47/32* (2006.01)
*B65G 47/82* (2006.01)

(52) U.S. Cl.
CPC ............... *B65G 47/32* (2013.01); *B65G 47/82* (2013.01)
USPC ...................................... 198/459.5

(58) Field of Classification Search
None
See application file for complete search history.

(56) References Cited

U.S. PATENT DOCUMENTS

| 2,980,234 | A |   | 4/1961 | De Koning |            |
|-----------|---|---|--------|-----------|------------|
| 4,394,896 | A | * | 7/1983 | McComas et al. | 198/341.06 |
| 6,431,345 | B2| * | 8/2002 | Burgener et al. | 198/461.3  |

* cited by examiner

*Primary Examiner* — Kavel Singh
(74) *Attorney, Agent, or Firm* — Jeffrey S. Melcher; Manelli Selter PLLC

(57) ABSTRACT

A transfer mechanism that transfers boards from a first conveyor onto a second conveyor having lugs using a stop, a cammed wheel for lifting boards over the stop, and a programmable computer controller for controlling the cammed wheel independent of the speed of the first and second conveyors.

10 Claims, 2 Drawing Sheets

HIGH SPEED BOARD FEEDER

This application claims priority to U.S. provisional patent application Ser. No. 61/174,716, filed on 1 May 2009, the complete disclosure of which is incorporated herein by reference.

FIELD OF THE INVENTION

This invention relates to a high speed transfer mechanism that transfers boards from a first conveyor onto a second conveyor having lugs.

BACKGROUND

Lumber processing is highly automated and in certain processing stations, the boards need to be precisely spaced apart on the conveyor when entering a station. To achieve this spaced relationship, the boards are commonly transferred from a conveyor where the boards are in close or abutting relationship onto a second conveyor having lugs that determine the desired spacing. A transfer mechanism controls the transfer from one conveyor onto the other to assure the relationship desired.

A typical transfer mechanism employs an intermediate pick off wheel and a stop member. The board movement is stopped on the first conveyor (although the conveyor typically continues to slide under the boards) and each leading board in turn is picked off the first conveyor by the pick off wheel and carried over onto the next conveyor in timed sequence.

U.S. Pat. Nos. 2,980,234 and 6,431,345 both describes a transfer mechanism that lifts the forward bottom edge of a board over a stop in order to transfer the board from a first conveyor to a second conveyor.

It is generally a requirement to stop the feeding of lumber without stopping the lugged conveyor. This can be accomplished by having moveable stops hold back the layer of boards so as to not engage the pickoff wheel or feed mechanism. Alternately, the feed wheel can be stopped with a mechanical clutch arrangement. The clutch must be of a type to engage or disengage at a fixed rotary position relative to the rotation so as to maintain the timing of the feed to the lugs. The first means has problems operating at high speeds because the time available to activate the moveable stops becomes too short or limited. The second means has a problem with the fixed or even finite multiple fixed engagement/disengagement positions not being adequate to allow for a wide speed variation of the lugged conveyor.

SUMMARY

An objective is to provide a variable speed transfer mechanism that can easily adjust placement of the board on a second conveyor to account for different second conveyor speeds and allow for different phase timing required during stops and starts.

Another objective is to provide a variable speed transfer mechanism that is not limited by the speed of the conveyors.

These objectives and other objectives are obtained by a board feeder comprising:
 a first conveyor having a board discharge end and being constructed and arranged to convey boards in edge-to-edge relation;
 a second conveyor having a board receiving end, the board discharge end of the first conveyor overlapping the board receiving end of the second conveyor, the second conveyor having a plurality of spaced apart lugs constructed and arranged for conveying boards in a spaced relation;
 a lug sensor for sensing the location of the lugs and speed of the second conveyor;
 a stop constructed and arranged for stopping boards on the first conveyor at the discharge end of the first conveyor such that when boards are stopped by the stop during operation the first conveyor slides under a plurality of boards stopped by the stop;
 a cam wheel having a periphery, and camming lobes formed on the periphery constructed and arranged to engage a leading edge of a leading board that is engaging the stop to lift the leading edge of the leading board over the stop during operation and the first conveyor urging continued movement of the plurality of boards to move the leading board over the stop and onto the receiving end of said second conveyor during operation;
 a cam wheel variable speed drive constructed and arranged for driving the cam wheel at variable speeds;
 a cam wheel sensor in communication with the cam wheel to sense the location of the cam wheel; and
 a programmable control unit in communication with the lug sensor, the cam wheel sensor and the cam wheel variable speed drive for controlling operation of the cam wheel independent of the first and second conveyors.

These objectives and other objectives are also obtained by a method of feeding boards comprising:
 conveying a plurality of boards on a first conveyor having a board discharge end such that the leading edge of the plurality of boards contacts a stop so that a plurality of boards are stopped at the discharge end and the first conveyor slides under the stopped boards;
 driving a cam wheel having a periphery and camming lobes formed on the periphery so that a camming lobe engages a leading edge of a leading board that is engaging the stop to lift the leading edge of the leading board over the stop so that the first conveyor urges movement of the plurality of boards to move the leading board over the stop and onto the receiving end of a second conveyor, the second conveyor having lugs and a lug sensor for sensing the location of the lugs and speed of the second conveyor, and the cam wheel being driven by a cam wheel variable speed drive constructed and arranged for driving the cam wheel at variable speeds and a cam wheel sensor in communication with the cam wheel to sense the location and speed of the cam wheel; and
 using a programmable control unit in communication with the lug sensor, the cam wheel sensor and the cam wheel variable speed drive for controlling operation of the cam wheel independent of the first and second conveyors.

DETAILED DESCRIPTION

Figure 1:
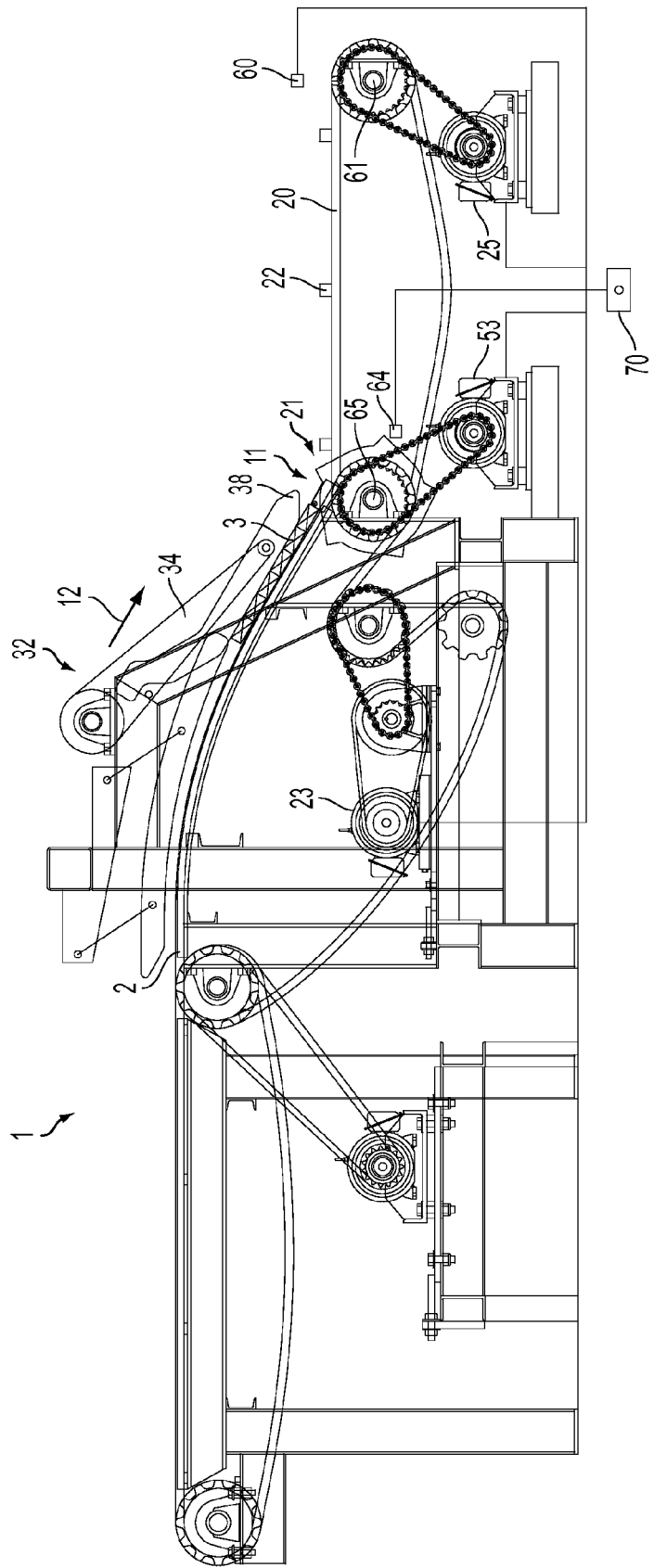
FIG. 1 is a side view of a board feeder.
Figure 2:
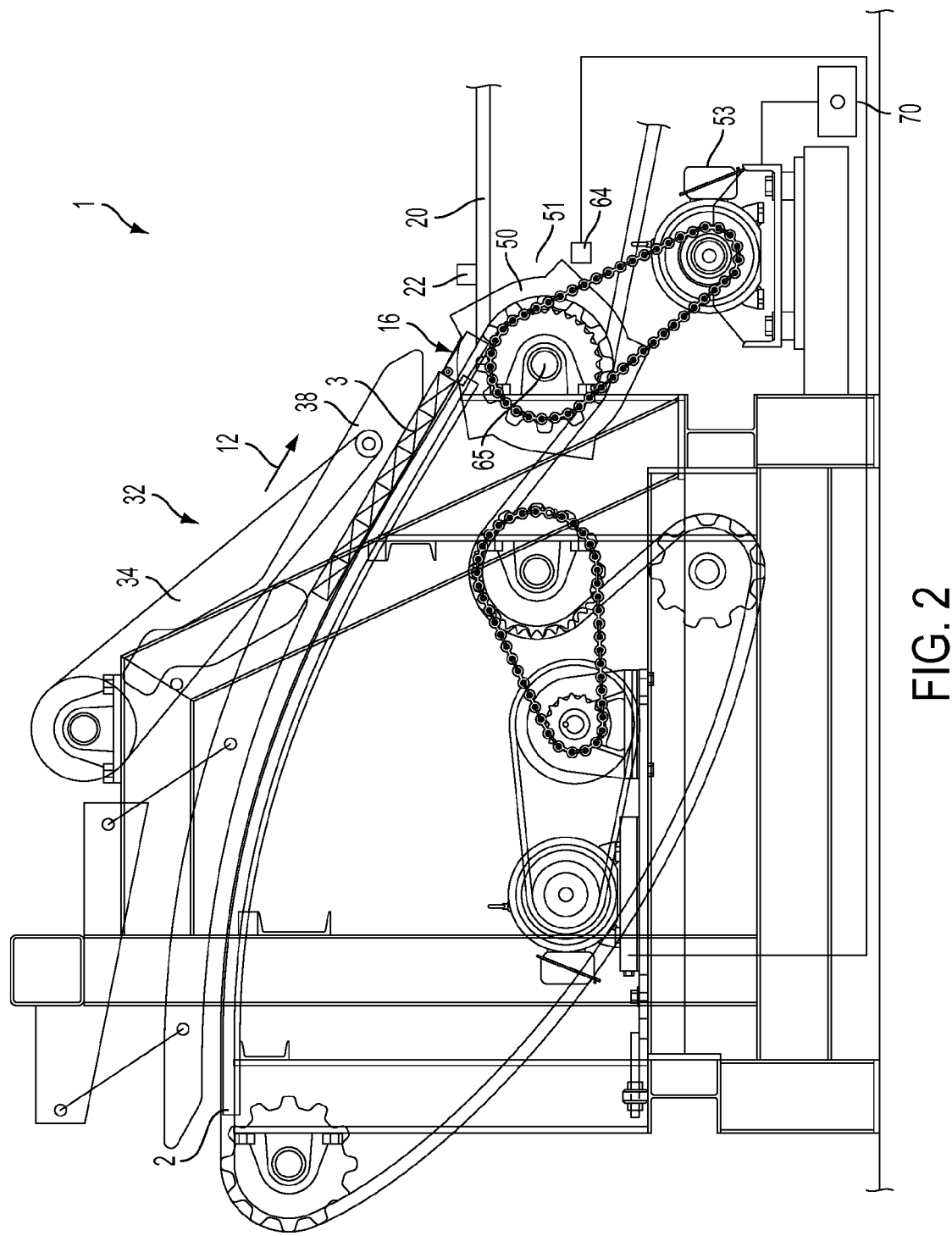
FIG. 2 is a side view of a board feeder.

The inventions will be explained with reference to the attached Figs. without being limited thereto. FIGS. 1 and 2 illustrate a board feeder 1 for a lumber processing line. The processing line has a first conveyor 2 that conveys boards 3 in the direction indicated by arrow 12 with the boards 3 being abutted in an edge-to-edge arrangement at the discharge end 11 of the first conveyor 2. The first conveyor 2 is preferably a chain type conveyor with the discharge end 11 providing a descending array of boards 3. The boards 3 are transported by the first conveyor 2 until the lead board engages a stop 16 which stops the motion of the boards 3. The chain of the first conveyor 3 continues to travel with the chain simply sliding under the plurality of boards 3 stopped by the stop 16.

A second conveyor 20 has a receiving end 21 that overlaps with the discharge end 11 of the first conveyor 2. The second conveyor 20 has a plurality of spaced apart lugs 22 constructed and arranged for engaging the trailing side edges of each of the boards 3 and transport the boards 3 to a subsequent operation.

The first conveyor 2 is driven by a drive 23. The second conveyor 20 is driven by a drive 25.

The boards 3 are held in position behind the stop 16 with the aid of a hold down mechanism 32. The hold down mechanism 32 assures that the plurality of boards 3 will remain in an edge-to-edge contact on the first conveyor 2 and will prevent one board 3 from flipping upwardly to be deposited on a previous or subsequent board 3. The hold down mechanism 32 has an arm 34 that is pivotally mounted to a slide 38. The hold down mechanism 32 provides a biasing force through slide 38 to hold the boards 3 downwardly on the first conveyor 2 and against the stop 16. The slide 38 does, however, permit the leading board 3 to be lifted above the fixed stop 16 by a lift mechanism to transfer the board 3 onto the second conveyor 20.

The lift mechanism comprises a cam wheel 50 having a periphery, and camming lobes 51 formed on the periphery constructed and arranged to engage a leading edge of the leading board 3 that is engaging the stop 16 to lift the leading edge of the leading board 3 over the stop 16 during operation. The cam wheel 50 is driven by a variable speed drive 53. While preferably five lobes 51 as shown in the Figs are used, any number of lobes 51 can be used as desired.

A non-limiting example of a suitable drive 53 is a properly sized A/C closed loop variable speed drive, such as A.B. Powerflex 700 or other commercially available A/C motor. Other suitable drives 53 are commercially available servo motors having an amplifier module.

A cam wheel sensor 64 is used to sense the location of the cam wheel 50. The cam wheel sensor 64 can be an encoder which senses the location and speed of the shaft 65 to which the cam wheel 50 is mounted. Alternatively, the cam wheel sensor 64 comprises an encoder that is internal to the drive 53 in conjunction with a shaft position reference switch mounted on shaft of the drive 53, such as, metal detecting proximity switch. A non-limiting commercial example of the cam wheel sensor 64 is an Electrocam PS4256 absolute grey code encoder mounted to the shaft 65 or to another shaft in communication with the cam wheel 50.

A lug sensor 60 is used to sense the location of the lugs 22. The lug sensor 60 can also be used to determine the speed of the second conveyor 20 or optionally a second conveyor speed sensor can be used to determine the speed of the second conveyor 20. The lug sensor 60 can be a position encoder that determines the position and speed of the shaft 61 to which the drive gear and second conveyor 20 are connected. By knowing the position and speed of the shaft 61, the position of the lugs 22 and speed of the second conveyor 20 can be determined.

A programmable control unit 70 is in communication with the lug sensor 60, the cam wheel sensor 64 and the cam wheel variable speed drive 53 for controlling operation of the cam wheel 50 independent of the first and second conveyors 2 and 20. The control unit 70 can also be in communication with the drives 23 and 25 for controlling the speeds of the first and second conveyors 2 and 20.

A non-limiting commercial example of the programmable controller 70 is an A.B. ControLogix 5000 series. Any suitable computerized controller can be used to electronically synchronize the drives to track each other, plus allow for stops and starts independently.

The variable speed drive 53 can account for slippage and acceleration of the board 3 when it is transferred to the second conveyor 20. Since the second conveyer 20 speed is greater than the speed of the board 3 being placed on it, the board 3 must be placed on a conveyor 20 at a position farther ahead of the lug 22 so as the board is accelerated it ends up against the lug 22.

This separate drive 53 is electronically kept in time with the lugged second conveyor 20 by the programmable logic controller 70 that tracks the second conveyor 20 speed and lug 22 position. The present variable transfer mechanism is preferable to conventional transfer mechanisms that can merely engage and disengage (to stop the feed) in a single or multiple but finite number of fixed positions mechanically because there is a dynamic positioning allowance required to stop and restart in synch with the second conveyor 20 running at different speeds. Most applications require that the second conveyor 20 have a fairly wide speed range dependent on the product being processed, which conventional transfer mechanisms cannot account for.

Programmable logic controllers and encoders have been used to transfer boards from one conveyor having lugs to another conveyor having lugs. However, the use of a programmable logic controller and encoders has never been used to time a feed wheel of this description to the knowledge of the inventor.

The present inventions also provide a method of using the variable transfer mechanism. A plurality of boards 3 are conveyed on a first conveyor 2 having a board discharge end 11 such that the leading edge of the plurality of boards 3 contacts a stop 16 so that a plurality of boards 3 are stopped at the discharge end 11 and the first conveyor 2 slides under the stopped boards 3. A cam wheel 50 having a periphery and camming lobes 51 formed on the periphery is driven so that a camming lobe 51 engages a leading edge of a leading board 3 that is engaging the stop 16 to lift the leading edge of the leading board 3 over the stop 16 so that the first conveyor 2 urges movement of the plurality of boards 3 to move the leading board over the stop 16 and onto the receiving end 21 of a second conveyor 20. The second conveyor 20 having lugs 22 and a lug sensor 60 for sensing the location of the lugs 22 and speed of the second conveyor 20. The cam wheel 50 being driven by a cam wheel variable speed drive 53 constructed and arranged for driving the cam wheel 50 at variable speeds and a cam wheel sensor 64 in communication with the cam wheel 50 to sense the location and speed of the cam wheel 50. A programmable control unit 70 in communication with the lug sensor 60, the cam wheel sensor 64 and the cam wheel variable speed drive 53 is used for controlling operation of the cam wheel 50 independent of the first and second conveyors 2 and 20.

While the claimed invention has been described in detail and with reference to specific embodiments thereof, it will be apparent to one of ordinary skill in the art that various changes and modifications can be made to the claimed invention without departing from the spirit and scope thereof.

We claim:

1. A board feeder comprising:
   a first conveyor having a board discharge end and being constructed and arranged to convey boards in edge-to-edge relation;

a second conveyor having a board receiving end, the board discharge end of the first conveyor overlapping the board receiving end of the second conveyor, the second conveyor having a plurality of spaced apart lugs constructed and arranged for conveying boards in a spaced relation;

a lug sensor for sensing the location of the lugs and speed of the second conveyor;

a stop constructed and arranged for stopping boards on the first conveyor at the discharge end of the first conveyor such that when boards are stopped by the stop during operation the first conveyor slides under a plurality of boards stopped by the stop;

a cam wheel having a periphery, and camming lobes formed on the periphery constructed and arranged to engage a leading edge of a leading board that is engaging the stop to lift the leading edge of the leading board over the stop during operation and the first conveyor urging continued movement of the plurality of boards to move the leading board over the stop and onto the receiving end of said second conveyor during operation;

a cam wheel variable speed drive constructed and arranged for driving the cam wheel at variable speeds;

a cam wheel sensor in communication with the cam wheel to sense the location of the cam wheel; and a programmable control unit in communication with the lug sensor, the cam wheel sensor and the cam wheel variable speed drive for controlling operation of the cam wheel independent of the first and second conveyors.

2. A board feeder according to claim 1, wherein the first conveyor is arranged in a descending path.

3. A board feeder according to claim 1, further comprising a hold down mechanism for holding the plurality of boards other than the leading board during operation.

4. A board feeder according to claim 1, further comprising a second conveyor drive for driving the second conveyor, wherein the programmable control unit is in communication with the second conveyor drive for controlling the speed of the second conveyor.

5. A board feeder according to claim 1, further comprising a first conveyor drive for driving the first conveyor, wherein the programmable control unit is in communication with the first conveyor drive for controlling the speed of the first conveyor.

6. A method of feeding boards comprising:

conveying a plurality of boards on a first conveyor having a board discharge end such that the leading edge of the plurality of boards contacts a stop so that a plurality of boards are stopped at the discharge end and the first conveyor slides under the stopped boards;

driving a cam wheel having a periphery and camming lobes formed on the periphery so that a camming lobe engages a leading edge of a leading board that is engaging the stop to lift the leading edge of the leading board over the stop so that the first conveyor urges movement of the plurality of boards to move the leading board over the stop and onto the receiving end of a second conveyor, the second conveyor having lugs and a lug sensor for sensing the location of the lugs and speed of the second conveyor, and the cam wheel being driven by a cam wheel variable speed drive constructed and arranged for driving the cam wheel at variable speeds and a cam wheel sensor in communication with the cam wheel to sense the location and speed of the cam wheel; and using a programmable control unit in communication with the lug sensor, the cam wheel sensor and the cam wheel variable speed drive for controlling operation of the cam wheel independent of the first and second conveyors.

7. A method according to claim 6, wherein boards are conveyed in a descending path on the first conveyor.

8. A method according to claim 6, further comprising using a hold down mechanism to hold the plurality of boards other than the leading board.

9. A method according to claim 6, further comprising using a second conveyor drive for driving the second conveyor, wherein the programmable control unit is in communication with the second conveyor drive for controlling the speed of the second conveyor.

10. A method according to claim 6, further comprising using a first conveyor drive for driving the first conveyor, wherein the programmable control unit is in communication with the first conveyor drive for controlling the speed of the first conveyor.

* * * * *